(12) United States Patent  (10) Patent No.: US 10,066,804 B2
Zawacki  (45) Date of Patent: Sep. 4, 2018

(54) LIGHTING ASSEMBLY WITH INTEGRATED OPTICAL DIFFUSER

(71) Applicant: GM GLOBAL TECHNOLOGY OPERATIONS LLC, Detroit, MI (US)

(72) Inventor: Jeffrey T. Zawacki, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 15/168,756

(22) Filed: May 31, 2016

(65) Prior Publication Data

US 2017/0343181 A1 Nov. 30, 2017

(51) Int. Cl.

| | |
|---|---|
| *F21S 43/237* | (2018.01) |
| *F21S 43/245* | (2018.01) |
| *F21S 43/249* | (2018.01) |
| *F21S 43/40* | (2018.01) |

(52) U.S. Cl.
CPC .......... *F21S 43/237* (2018.01); *F21S 43/245* (2018.01); *F21S 43/249* (2018.01); *F21S 43/40* (2018.01); *B60Q 2400/20* (2013.01)

(58) Field of Classification Search
CPC ....... B60Q 1/0011; F21S 43/249; F21S 43/40; F21S 43/245
See application file for complete search history.

(56) References Cited

U.S. PATENT DOCUMENTS

| | | | | |
|---|---|---|---|---|
| 7,452,114 B2* | 11/2008 | Gasquet | ............... | B60Q 1/2696 362/511 |
| 9,791,614 B2* | 10/2017 | Nishihata | ............. | G02B 6/0038 |
| 2008/0013333 A1* | 1/2008 | Koizumi | ............. | B60Q 1/2696 362/511 |
| 2010/0202153 A1* | 8/2010 | Schwab | ............... | B60Q 1/0041 362/520 |
| 2014/0016338 A1* | 1/2014 | Yang | .................... | B60Q 1/0041 362/487 |

* cited by examiner

*Primary Examiner* — Robert May
(74) *Attorney, Agent, or Firm* — Quinn IP Law

(57) ABSTRACT

An integrated lighting element assembly includes a transparent light-transmitting portion and an opaque or translucent optical diffuser. The light-transmitting portion has a light-transmitting surface. The optical diffuser is integrated or co-molded with the light-transmitting element to form a boundary of the light-transmitting surface. A light source is configured to direct incident light into the light-transmitting portion in response to a lighting control signal. A controller may generate the lighting control signal in response to activation of a user input device such as a turn signal lever or transmission mode selection lever. The optical diffuser may be parallel to and contiguous with the longitudinal surfaces of the light-transmitting element. A headlight assembly includes first and second headlights having respective low- and high-beam functions, and the lighting element assembly, which is positioned with respect to one of the headlights.

20 Claims, 2 Drawing Sheets

LIGHTING ASSEMBLY WITH INTEGRATED OPTICAL DIFFUSER

TECHNICAL FIELD

The disclosure relates to a lighting assembly with an integrated optical diffuser.

BACKGROUND

Light assemblies may be configured to provide a single lighting function, such as task lighting, accent lighting, and the like, or to provide several different lighting functions. For example, a vehicle headlight assembly can provide high-beam and low-beam functions in addition to a daytime running light (DRL) function and a position lighting function. The high-beams and low-beams of a headlight assembly illuminate a roadway ahead of the vehicle to enhance overall roadway visibility. The DRL function and the position lighting function of the same headlight assembly provide lighting that improves visibility of the vehicle to pedestrians and oncoming traffic. The various lighting functions may be housed together in a common housing.

SUMMARY

An integrated lighting element assembly includes a transparent light-transmitting portion having a light-transmitting surface, and an opaque or translucent optical diffuser. The optical diffuser is integrated or co-molded with the light-transmitting element to form a boundary of the light-transmitting surface.

In a particular embodiment, the integrated lighting assembly may include an elongated light-transmitting element and an optical diffuser integrated with the light-transmitting element. The assembly may include at least one light source, e.g., a light-transmitting diode (LED) device. The light-transmitting element may include first and second longitudinal surfaces, and may define a semi-circular light-transmitting area in side cross-section. The optical diffuser, which is "integrated" with the light-transmitting element in the sense that the optical diffuser and light-transmitting element are co-molded or otherwise integrally formed, forms a boundary of the light-transmitting area. Each light source may be positioned at a distal end of the light-transmitting element and configured to direct incident light into the elongated light-transmitting element in response to a lighting control signal.

The light-transmitting element may be embodied as a light pipe or light guide having optical features that collect and disperse light. Optionally, the light assembly may be controlled as a daytime running light (DRL) function, front position light, or front turn signal, although other lighting applications may be envisioned. The present light assembly overcomes loss of viewable light at extreme viewing angles, i.e., both inboard and outboard with respect to the light assembly as well as upward/downward viewing angles while meeting the requirements of any associated lighting functions. The light-transmitting element is intended to glow and appear more homogenous while eliminating or reducing the pixilation of light in the off-axis viewing angles.

A controller may be programmed to transmit a lighting control signal to the lighting device so as to command activation of the lighting element, and to thereby request a corresponding lighting function, e.g., a turn signal function, a DRL function, a park function, and/or a position function in an example vehicle lighting configuration.

A headlight assembly includes a first headlight having a low-beam function, a second headlight having a high-beam function, and an integrated lighting element assembly positioned with respect to the first or second headlights. The integrated lighting element includes a transparent light-transmitting portion having first and second longitudinal surfaces. The integrated lighting element also includes an opaque or translucent optical diffuser integrated or co-molded with the light-transmitting element to form a boundary of the light-transmitting area. At least one light source in the form of a light-transmitting diode is positioned with respect to an end of the light-transmitting element and configured to direct incident light into the light-transmitting portion in response to a lighting control signal.

The above features and advantages and other features and advantages of the present disclosure are readily apparent from the following detailed description of the best modes for carrying out the disclosure when taken in connection with the accompanying drawings.

DETAILED DESCRIPTION

Figure 1:
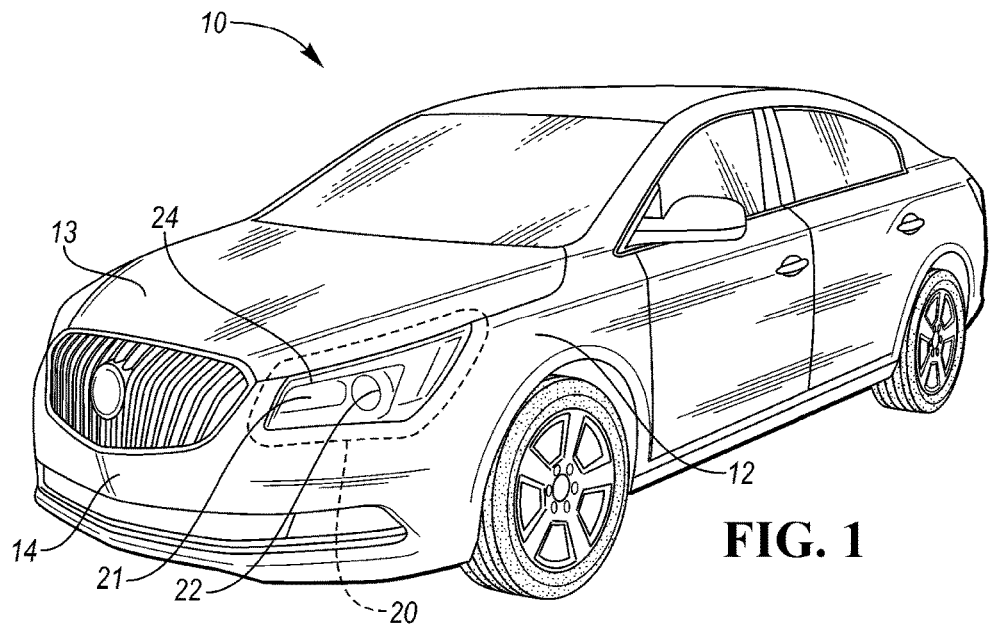
FIG. 1 is a schematic perspective view illustration of a vehicle having a lighting assembly with an integrated optical diffuser.

Referring to the Figures, wherein like numerals indicate like parts throughout the several views, a system in the form of an example vehicle 10 is depicted in FIG. 1. The vehicle 10 has a body 12 and a hood 13, with the hood 13 positioned proximate to a front end 14 of the vehicle 10. The vehicle 10 includes a headlight assembly 20 that may include an integrated lighting assembly 24 in the form of a light pipe or a light guide having integrated/co-molded optical features that collect and disperse light as best shown in FIGS. 3 and 4. The integrated lighting assembly 24 may be shaped into one or more linear, bent, or curved lengths, including the arcuate, angles, or generally L-shaped configuration of FIG. 2, with the particular shape and arrangement depending on the lighting application with which the integrated lighting assembly 24 will be used.

Figure 2:
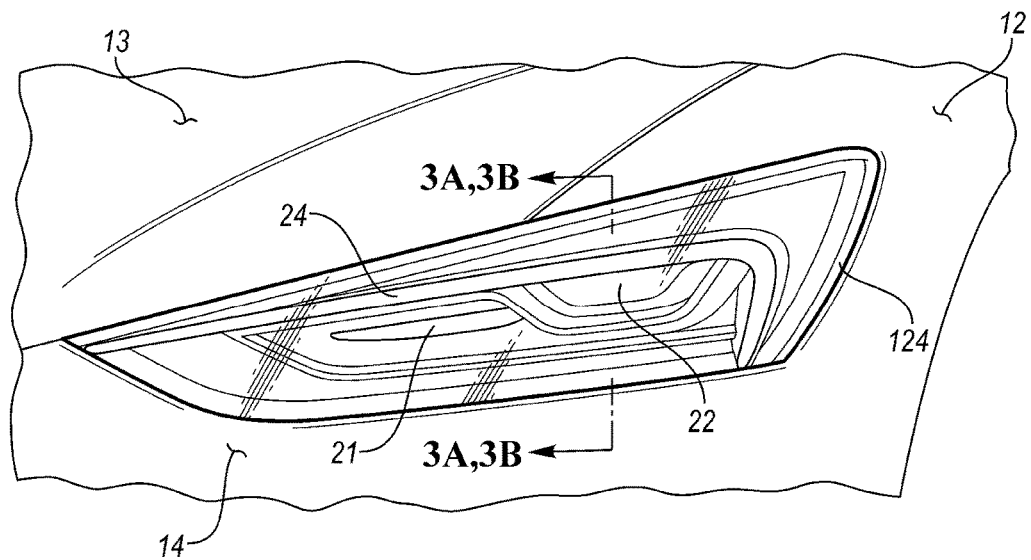
FIG. 2 is a schematic perspective view illustration of an embodiment of a lighting assembly usable with the vehicle of FIG. 1 or in other applications.

The headlight assembly 20 having the integrated lighting assembly 24 may be configured for use adjacent to the hood 13 as part of a non-limiting example headlight assembly shown in FIGS. 1 and 2, and may be shaped in any fashion so as to present a desired aesthetic appearance. Alternatively, the integrated lighting assembly 24 may be used at other locations of the vehicle 10, for instance in a tail light assembly (not shown) to provide backup indication or other suitable illumination. The integrated lighting assembly 24 may be used on other interior or exterior surfaces of the vehicle 10, such as interior ambient lighting.

Any stationary or mobile object requiring surface lighting may benefit from use of the present integrated lighting assembly 24 when properly scaled and configured for the particular application. The integrated lighting assembly 24 may enjoy use in various single-function or multi-function lighting applications, e.g., in commercial or residential buildings, display illumination, appliance illumination, accent lighting, and any other application in which the disclosed lighting effects are desirable. For illustrative consistency, the vehicle 10 will be described hereinafter as an example system without limiting use of the headlight assembly 20 to such an embodiment.

In addition to housing any conventional low-beam and high-beam lighting functions, with first and second headlights having a respective high-beam and low-beam function shown generally at 21 and 22 in FIGS. 1 and 2, the headlight assembly 20 in the embodiment of FIGS. 1 and 2 may be configured to provide a position light function and a daytime running light (DRL) function via controlled operation of the integrated lighting assembly 24, with such functions described generally above and well known in the art.

FIG. 2 depicts the headlight assembly 20 in a non-limiting example embodiment. The integrated lighting assembly 24 may be arranged with respect to the first and second headlights 21 and 22 with the high-beam and low-beam functions 21 and 22 in an arcuate, angled, bent, or L-shaped configuration as shown. A second integrated lighting assembly 124 may be arranged with respect to the integrated lighting assembly 24 and controlled as described below with reference to FIG. 4 to provide a different lighting function than that of the integrated lighting assembly 24.

Figure 3A:
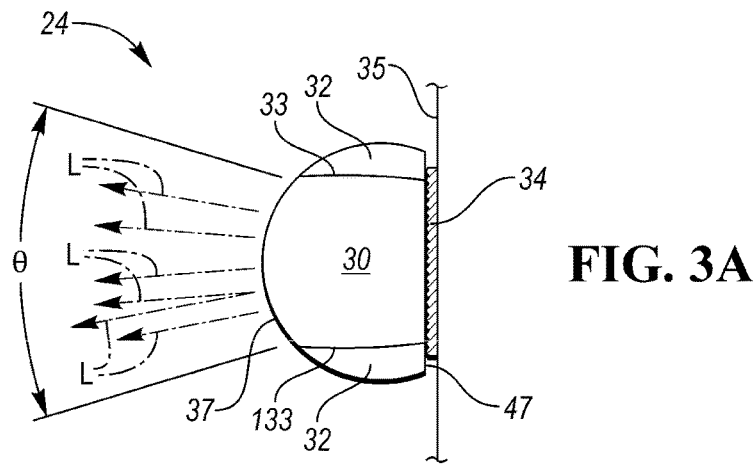
FIG. 3A is a schematic cross-sectional side view illustration of the lighting assembly of FIG. 2 taken along section line 3A-3B of FIG. 2.
Figure 3B:
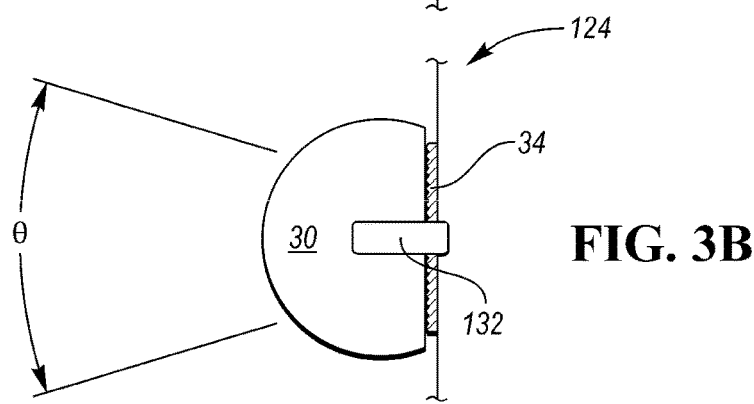
FIG. 3B is a schematic cross-sectional side view illustration of an alternative configuration of the lighting assembly of FIG. 3A.
Figure 4:
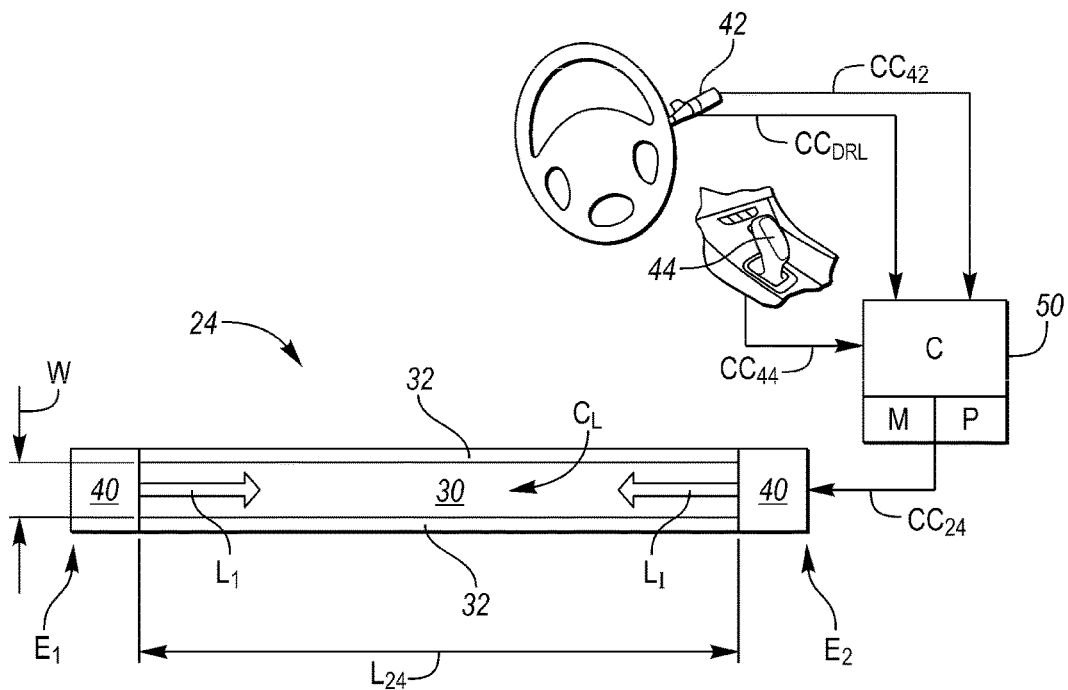
FIG. 4 is a schematic illustration of a lighting system using the lighting assembly shown in FIGS. 3A and 3B.

FIGS. 3A and 3B are schematic cross-sectional illustrations of the integrated lighting assembly 24 taken along section line 3A-3B of FIG. 2. The integrated lighting assembly 24 includes a light-transmitting portion 30 that is integrally formed or co-molded with an optical diffuser 32. The light-transmitting portion 30 may be constructed of a substantially clear/transparent, moldable material. The optical diffuser 32 is opaque or translucent, e.g., at least 20% of incident light is diffused in the optical diffuser 32 with less than 20% of incident light being diffused in the light-transmitting portion 30, and is configured to disperse light (arrows L) emitted through a front light-transmitting surface 37 of the light-transmitting portion 30.

To facilitate manufacturing, the configuration should be moldable in a "multi-shot" injection molding process such that the light-transmitting portion 30 and the optical diffuser 32 form a co-molded unitary component. As used herein, the term "composite" requires at least two co-molded materials of different composition, with a boundary 33, 133 defining an area of transition from a material of the light-transmitting portion 30 to a different material of the optical diffuser 32. Due to the different materials of construction, the light-transmitting portion 30 and the optical diffuser 32 may be manufactured from a two-shot or three-shot molding process, as is well known in the art, such that the light-transmitting portion 30 and the optical diffuser 32 are integrally connected together without any visible seams.

The two-shot molding process may include, by way of example, molding the light-transmitting portion 30 from polycarbonate or acrylic in a suitable mold (not shown). Other approaches may include using PLEXIGLAS LD24 or LD48 material, or inlaying a film, laser etching, adding metallic flake material, or otherwise forming a desired texture or appearance to the optical diffuser 32. When the light-transmitting portion 30 has sufficiently cooled and solidified, such a mold may be adjusted and the optical diffuser 32 may be molded onto light-transmitting portion 30. Other approaches may include inlaying a film, laser etching, adding metallic flake material, or otherwise forming a desired texture or appearance to the optical diffuser 32. Then, an integral piece formed via the light-transmitting portion 30 and optical diffuser 32 is connected to a component surface 35, e.g., of the vehicle 10 of FIG. 1 or another vehicular or non-vehicular surface, such as via epoxy bonding or by otherwise securing the integrated lighting assembly 24 to the component surface 35.

The light-transmitting portion 30 may have first and second longitudinal surfaces defining the boundaries 33, 133, and may define a semi-circular light-transmitting area in side cross-section as shown in FIGS. 3A and 3B. The optical diffuser 32 is integrated with the light-transmitting portion 30. In the embodiment of FIG. 3A, the optical diffuser 32 is positioned parallel to and contiguous with the optical diffuser 32 to form or define the boundaries 33, 133 of the light-transmitting portion 30, i.e., the outer bounds or limits of the light-transmitting portion 30. Thus, a light band (θ) of emitted light (arrows L) is defined and limited by the optical diffuser 32.

In FIG. 3B, the optical diffuser 32 of FIG. 3A is modified to form an optical diffuser 132 located in front of the light sources 40 of FIG. 4. That is, the optical diffuser 32 may be positioned and oriented anywhere within the light-transmitting portion 30 in the integrated lighting assemblies 24 or 124 of FIGS. 3A and 3B, respectively, so as to provide the desired amount of diffusion at extreme lateral or vertical viewing angles.

Optionally, a rear surface 47 positioned opposite the front light-transmitting surface 37 of the light-transmitting portion 30 may be connected to or formed integrally with a reflective optics element 34. The reflective optics element 34 may be configured to direct incident light (arrows $L_I$ of FIG. 4) through the light-transmitting portion 30 and out of the front surface 37. Various configurations and materials may be used for the optics element 34. For instance, the reflective optics element 34 may be constructed of acrylic or of reflective material such as polished aluminum, and may be flat or serrated. The reflective optics element 34 may be bonded to the component surface 35 and the rear surface 47.

Referring to FIG. 4, the optical diffuser 32 may extend between first and second distal ends E1 and E2 over a length $L_{24}$ parallel to the light-transmitting portion 30. While shown as a rectangular structure in FIG. 4 for illustrative clarity, the actual shape of the integrated lighting assembly 24 may vary as noted above. As viewed into the front light-transmitting surface 37 of FIG. 3A, each run of the optical diffuser 32 may make up about 15-25% of the width (W) of the light-transmitting portion 30 in some embodiments. The optical diffuser 32 in all embodiments serves to render lighting uniform when viewed from extreme side angles, e.g., when standing next to the vehicle 10 of FIG. 1, such that the light (arrows L of FIG. 3A) does not fade or appear to diminish from extreme or lateral viewing angles.

One or more light sources 40 may be used to irradiate the light-transmitting portion 30. For example, a separate light source 40 may be positioned at the first and second distal ends E1 and E2, respectively, and configured to direct incident light (arrows $L_I$) into the light-transmitting portion 30 in response to a lighting control signal (arrow $CC_{24}$) from a controller (C) 50, possibly having memory (M) and a processor (P) as explained below.

The lighting sources 40 may be white LEDs in an example embodiment, or single-color or color-changing LEDs in another, e.g., red, blue, green (RGB) color-changing LEDs of the type known in the art. Each lighting source 40 receives the lighting control signal (arrow $CC_{24}$), e.g., a control voltage and/or current, that causes the receiving lighting source 40 to illuminate in response to a selected lighting function. In the example vehicular applications described above, for instance, a driver of the vehicle 10 of FIG. 1 may activate a user input device in the form of, e.g., a turn signal lever 42, or position a user input device in the form of a transmission mode selection lever 44, e.g., a park, reverse, neutral, drive, low (PRNDL) lever. Movement of the turn signal lever 42 may result in generation of a turn signal request (arrow $CC_{42}$). Similarly, shifting the transmission mode selection lever 44 may result in generation of a position request (arrow $CC_{44}$) and/or a DRL request (arrow $CC_{DRL}$). Other user input devices may be used to generate the lighting control signal (arrow $CC_{24}$), such as a lighting control knob (not shown). When using color-changing LEDs as the lighting source(s) 40, the color of the LED may be automatically modified depending on the nature of the lighting control signal (arrow $CC_{24}$), e.g., with white light used for a DRL function, amber light for front turn signal indication, and red light used for rear indication in the non-limiting vehicle embodiment.

When activated, each lighting source 40 irradiates a lighting cavity ($C_L$) of the light-transmitting portion 30 with visible incident light (arrow $L_I$) from a corresponding one of the distal ends E1 and E2. The incident light (arrow $L_I$) propagates within the light-transmitting portion 30 and ultimately exits the lighting cavity ($C_L$) through the front surface 37 of the light-transmitting portion 30 with a spread defined by the angle of the light band (θ). The spread or cone size of the light band (θ) is defined by the size, orientation, and shape of the optical diffuser 32. That is, the optical diffuser 32 is integrated or co-molded with the light-transmitting element 30 so as to form a boundary of the light-transmitting area, i.e., the surface area of the front surface 37 through which light (arrows L of FIG. 3A) is transmitted.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An integrated lighting element assembly comprising:
an elongated transparent light-transmitting portion constructed of a material having a first composition, the transparent light-transmitting portion having a light-transmitting surface; and
an opaque or translucent optical diffuser constructed of a material having a second composition distinct from the first composition and configured to diffuse less than 20% of incident light, the material of the second composition being co-molded with the material of the first composition to form a composite material defining a lateral or vertical boundary of the light-transmitting surface, without any visible seams, the boundary providing an area of transition from the material of the first composition to the material of the second composition.

2. The assembly of claim 1, further comprising:
at least one light source positioned with respect to the light-transmitting portion and configured to direct incident light into the light-transmitting portion in response to a lighting control signal.

3. The assembly of claim 2, wherein the at least one light source includes a pair of light sources each positioned at an opposite distal end of the light-transmitting portion.

4. The assembly of claim 2, further comprising a controller operable for generating the lighting control signal in response to activation of a user input device.

5. The assembly of claim 4, wherein the user input device is a turn signal lever and activation of the user input device commands illumination of the at least one light source with amber light.

6. The assembly of claim 4, wherein the user input device is a transmission mode selection lever and activation of the user input device commands illumination of the at least one light source with white light.

7. The assembly of claim 2, wherein the at least one light source includes a pair of light sources each positioned at an opposite distal end of the light-transmitting portion.

8. The assembly of claim 7, wherein the pair of light sources each includes at least one light-transmitting diode.

9. The assembly of claim 1, wherein the optical diffuser is arranged parallel to and contiguous with the light-transmitting portion.

10. The assembly of claim 9, wherein the optical diffuser defines a semi-circular light-transmitting area in a side cross-sectional view.

11. The assembly of claim 1, further comprising a reflective optics element configured to direct incident light from the at least one light source through the light-transmitting portion.

12. The assembly of claim 1, further comprising a reflective optics element configured to reflect incident light from the at least one light source through the light-transmitting portion.

13. The assembly of claim 12, wherein the reflective optics element is serrated and constructed of acrylic.

14. A headlight assembly comprising:
a first headlight having a low-beam function;
a second headlight having a high-beam function; and
an integrated lighting element assembly positioned with respect to the first or second headlights and having:
an elongated transparent light-transmitting portion constructed of a material having a first composition, the transparent light-transmitting portion having a light-transmitting surface;
an opaque or translucent optical diffuser constructed of a material having a second composition distinct from the first composition, and that is co-molded with the material of the first composition to form a composite material defining a seamless lateral or vertical boundary of the light-transmitting portion, without any visible seams, the boundary providing an area of transition from the material of the first composition to the material of the second composition; and
at least one light source in the form of a light-transmitting diode positioned with respect to an end of the light-transmitting portion and configured to direct incident light into the light-transmitting portion in response to a lighting control signal.

15. The assembly of claim 14, wherein the at least one light source includes a pair of light sources each positioned at an opposite distal end of the light-transmitting portion.

16. The assembly of claim 14, further comprising a controller operable for generating the lighting control signal in response to activation of a user input device.

17. The assembly of claim 16, wherein the user input device is a turn signal lever and activation of the user input device commands illumination of the at least one light source with amber light.

18. The assembly of claim 16, wherein the user input device is a transmission mode selection lever and activation of the user input device commands illumination of the at least one light source with white light.

19. The assembly of claim 14, wherein the optical diffuser is parallel to and contiguous with the transparent light-transmitting portion.

20. The assembly of claim 19, wherein the optical diffuser defines a semi-circular light-transmitting area in a side cross-sectional view.

* * * * *